United States Patent
Chomik et al.

(10) Patent No.: US 8,219,790 B2
(45) Date of Patent: Jul. 10, 2012

(54) DETERMINING DEVICE-INTERNAL PARAMETER ADDRESSES FROM FIELDBUS-SPECIFIC PARAMETER ADDRESSES OF A FIELD DEVICE

(75) Inventors: Alain Chomik, Pulversheim (FR); Udo Fuchs, Tiengen (DE); Pierre Harnist, Bartenheim (FR)

(73) Assignee: Endress + Hauser Flowtec AG, Reinach (CH)

( * ) Notice: Subject to any disclaimer, the term of this patent is extended or adjusted under 35 U.S.C. 154(b) by 834 days.

(21) Appl. No.: 12/292,212

(22) Filed: Nov. 13, 2008

(65) Prior Publication Data
US 2009/0138693 A1     May 28, 2009

(30) Foreign Application Priority Data
Nov. 13, 2007   (DE) .......................... 10 2007 054 417

(51) Int. Cl.
*G06F 15/177* (2006.01)
(52) U.S. Cl. ................................ 713/1; 700/17; 700/19
(58) Field of Classification Search .................... 700/25, 700/17, 19; 713/1
See application file for complete search history.

(56) References Cited

U.S. PATENT DOCUMENTS
2004/0250025 A1* 12/2004 Bruckner et al. ............. 711/149
2011/0202145 A1*  8/2011 Shah et al. ........................ 700/9

OTHER PUBLICATIONS

Liang Geng, Research on a Control Strategy Configuration Platform for Field Intelligent Control Network. 8th International Conference on Electronic Measurement and Instruments, Aug. 16, 2007.

* cited by examiner

*Primary Examiner* — Albert Wang
(74) *Attorney, Agent, or Firm* — Bacon & Thomas, PLLC (57) ABSTRACT

A field device of process automation technology containing a plurality of parameters, with which are associated device-internal parameter addresses. The field device is connectable to a fieldbus having a fieldbus-specific parameter addressing system. In such case, the device-internal parameter addresses of the plurality of parameters are determinable by application of a generic mathematical function to belonging fieldbus-specific parameter addresses formed according to the fieldbus-specific parameter addressing system.

10 Claims, 4 Drawing Sheets

DS_Read

| Funct_Num 0x5E | Slot_Number | Index | ReqLength |
|---|---|---|---|

Fig. 6

DS_Write

| Funct_Num 0x5E | Slot_Number | Index | ResLength | Data |
|---|---|---|---|---|

Fig. 7

DETERMINING DEVICE-INTERNAL PARAMETER ADDRESSES FROM FIELDBUS-SPECIFIC PARAMETER ADDRESSES OF A FIELD DEVICE

TECHNICAL FIELD

The present invention relates to a field device of process automation technology.

BACKGROUND DISCUSSION

Often applied in process automation technology are field devices, which serve for registering and/or influencing process variables. Thus, sensors, such as, for example, fill-level measuring devices, flow measuring devices, pressure- and temperature-measuring devices, pH-redox potential measuring devices, conductivity measuring devices, serve for registering corresponding process variables, fill-level, flow (e.g. flow rate), pressure, temperature, pH-value, and conductivity, respectively, while actuators, such as, for example, valves or pumps, serve for influencing process variables, such as, for example, changing the flow of a liquid in a section of pipeline, or the fill-level in a container. Referred to as field devices are, in principle, all devices placed near a process for delivering or processing process-relevant information. Besides sensors and actuators, also referred to as field devices are units, such as remote I/Os, gateways, linking devices, etc., connected directly to a fieldbus and serving for communication with superordinated units. A large number of such field devices are manufactured and sold by the firm, Endress+Hauser.

In modern industrial plants, field devices are, as a rule, connected via bus systems (Profibus®, Foundation® Fieldbus, HART®, etc.) with superordinated units. Normally, the superordinated units are control systems, or control units, such as, for example, a PLC (programmable logic controller). The superordinated units serve for, among other purposes, process control, process visualization, process monitoring, as well as for start-up of the field devices.

For servicing field devices, especially for parametering and configuring (these being referenced generically in the following as "parametering") field devices and/or for readout of parameter values out of a field device, as a rule, a servicing program (operating tool—e.g. FieldCare® of Endress+Hauser) is provided in a superordinated unit. In the parametering, especially, parameters of the field device are set, or changed. The superordinated unit can, in such case, be connected directly to the fieldbus, to which the relevant field devices are connected, or to a superordinated communication network. Additionally, a field device can be serviced by a servicing unit, such as, for example, a portable personal computer (laptop), a portable, hand operating device (handheld), a PDA (Personal Digital Assistant), etc., in which a servicing program is implemented and which is connected to the fieldbus of the field device to be parametered.

In order to enable an accessing (e.g. a read access or a write access) of individual parameters of a field device, there are associated, at least with the parameters, which can be accessed via the fieldbus, in each case, fieldbus specific, parameter addresses. Depending on the kind of fieldbus used, in such case, a corresponding fieldbus-specific parameter addressing system is used. For example, in the bus system, Profibus®, an individual parameter is addressed by specifying its slot and index. The associating of slot and index to individual parameters is specified, for example, in the "Device Description" (DD) and/or in the "Device Type Manager" (DTM), so that it is available for a superordinated unit or a servicing device. This fieldbus-specific parameter addressing system is distinguished from the device internal parameter addressing system. Device-internally, the parameters are grouped in blocks ("BlockID"), depending on belonging, to individual function blocks (e.g. function blocks "Analog Input" (AI) and/or "Analog Output" (AO) (in the case of Profibus® and Foundation® Fieldbus), components (e.g. current supply, display, etc.), to a physical block, a transducer block, etc. Within the blocks, the parameters are distinguished device-internally by parameter identifications (ParameterID). The device-internal parameter addressing system, especially the association of the "BlockID" and the "ParameterID" to individual parameters, is determined, in such case, by the manufacturer of a field device.

SUMMARY AND ADVANTAGES

Accordingly, an object of the present invention is to provide a field device, in the case of which a simpler associating of the device-internal parameter addresses with the fieldbus-specific parameter addresses is possible and costs and effort associated with the introduction of further parameters can be reduced.

The object is achieved by a field device which has a plurality of parameters, each having an associated, device-internal parameter address. The field device is connectable to a fieldbus having a fieldbus-specific parameter address system. In such case, the device-internal parameter addresses of the plurality of parameters are determinable by application of a generic, mathematical function to associated fieldbus-specific parameter addresses formed according to the fieldbus-specific parameter address system.

Parameters are provided in a field device, as a rule, for operation, start-up, upkeep and diagnosis of the field device. The present invention relates, especially, to the parameters of a field device, which are accessible via the fieldbus. Such parameters are, especially, sensor- or actuator-parameters, such as, for example, measuring ranges, limit values, units, etc. As explained above in the introductory part of the description, as a rule, the different kinds of bus systems (Profibus®, Foundation® Fieldbus, HART®, etc.) have different parameter address systems. The associating of the individual fieldbus-specific parameter addresses with the respective parameters occurs, in such case, as a rule, in a "Device Description" (DD) and/or in a device driver for the field device, such as, for example, in a "Device Type Manager" (DTM), so that the respective fieldbus-specific parameter addresses of the individual parameters are available for a superordinated unit and/or a servicing device. The device-internal parameter addresses are, in contrast, assigned manufacturer-specifically. Within the field device, an accessing of a parameter is only possible by specifying its device-internal parameter address. The device-internal parameter address can, in such case, be selected independently of the particular fieldbus system, to which the field device is connectable, or connected.

The providing of a mathematical function has the advantage that such can be implemented easily in a corresponding algorithm in software of the field device. The mathematical function, or a corresponding algorithm, can, in such case, have one or more variables, wherein a fieldbus-specific parameter address (with a corresponding number of "coordinates", such as, for example, a "Slot" and an "Index" in the case of Profibus) is enterable into the mathematical function, or into the algorithm, in the form of a variable, or variables, as the case may be. By applying the mathematical function to the fieldbus-specific parameter address, then the device-internal parameter address is obtained. In such case, also the device-internal parameter addresses and, accordingly, also the output value of the mathematical function (or of the algorithm) can have more than only one "coordinate" (for instance, a "BlockID" and a "ParameterID"). "Generic" means, in such case, that one and the same mathematical function can be applied for determining the (different) device-internal parameter addresses of the plurality of parameters (from the corresponding fieldbus-specific parameter addresses).

As a rule, only one parameter address is associated with each parameter. Preferably, the mathematical function delivers for two different fieldbus-specific parameter addresses also two different device-internal parameter addresses.

On the basis of the present invention, it is no longer required that extensive mapping tables be stored in the field device and that updates of the same be performed in the case of introduction of further parameters. The present invention is, in such case, applicable, in general, to field devices, especially sensors and actuations. In such case, the field devices can be those with a hardwired interface, or a wireless interface, to the relevant fieldbus.

Preferably, the device-internal parameter addresses, the fieldbus-specific parameter addresses, and the generic, mathematical function are selected in such a manner that the number of parameters of the field device can be increased, and furthermore, by application of the generic mathematical function, an associating of the device-internal parameter addresses to the belonging fieldbus-specific parameter addresses of the increased number of parameters of the field device is possible. By the associating according to the invention of the device-internal parameter addresses to the fieldbus-specific parameter addresses by a generic, mathematical function, this is possible in especially simple manner. Thereby, not every time, when a new parameter is to be added for the field device (e.g. in the context of a software update), is a corresponding updating of a mapping table and associated software required. Rather, upon receipt of a telegram, in which the fieldbus-specific parameter address of the new parameter is contained, the associated, device-internal parameter address is obtainable easily by application of the generic mathematical function to the fieldbus-specific parameter address. In this way, costs and effort can be saved.

In an advantageous further development, in the device-internal parameter addressing system, the plurality of parameters are associated with device-internal groups, especially blocks, and the parameters associated with a device-internal group are, in each case, distinguished by device-internal indices, preferably by corresponding parameter identifications. Further, in an advantageous further development, in the fieldbus-specific parameter address system, the plurality of parameters are associated with fieldbus-specific groups, especially slots, and the parameters associated with a slot are, in each case, distinguished by fieldbus-specific indices. As a result, both the device-internal, as well as also the fieldbus-specific parameters are, in each case, specified by two "coordinates" (group and index). By specifying the group and the index, the parameter address of a parameter is uniquely determined. In the case of these two coordinates, depending on type of fieldbus as regards the fieldbus-specific parameter addressing system and depending on manufacturer as regards the device-internal parameter addressing system, different designations are customary. In the case of the preferred bus system, Profibus®, for the present invention, for example, in its fieldbus-specific parameter addressing system, "Slot" is provided as designation of the group and "Index" as designation of the index. In the device-internal parameter addressing system, "BlockID" is common for designating the group and "ParameterID" is common for designating the index.

Preferably, both in the case of the device-internal as well as also in the case of the fieldbus-specific addressing system, the individual groups and indices are numbered to increment (or, the other way around, to decrement). In the case where the numbers get bigger, the mathematical function can be simply a linear function. The numbering does not have to begin necessarily at "1", and it can also exhibit greater or smaller steps than whole numbers. In the fieldbus-specific parameter addressing system, preferably, different field devices are distinguished by their device addresses, so that two different field devices connected to a fieldbus can have identical groups and indices as fieldbus-specific parameter addresses.

In an advantageous further development, by the generic mathematical function, in each case, to a fieldbus-specific group of a fieldbus-specific parameter address is associated a belonging, device-internal group. Further, by the generic mathematical function, in each case, to a fieldbus-specific index of the fieldbus-specific parameter address is associated a belonging, device-internal index. In this way, a clear associating between the fieldbus-specific and the device-internal parameter addresses is obtained. Further, the number of the parameters within a group, and/or the number of groups as a whole, can be increased in simple manner. An especially simple presentation is obtained, when the respective associating of the groups and the respective associating of the indices occurs via two mutually independent, sub-functions.

In an advantageous further development, the field device is embodied in such a manner that the generic, mathematical function is automatically applicable to a fieldbus-specific parameter address, and the belonging, device-internal parameter address is determinable therefrom. By "automatically" is meant that the application of the mathematical function occurs automatically, without human intervention. The application of the mathematical function can be controlled, for example, by an appropriate control means. Preferably, the mathematical function is always applied, when there is received via the fieldbus, a telegram containing a fieldbus-specific parameter address. Preferably, the application of the mathematical function is performed by a correspondingly embodied piece of software. This functionality is, in such case, preferably located in layer 7 of the OSI reference model and/or above this layer 7.

In an advantageous further development, the field device has an I/O-board for connecting the field device to a fieldbus, preferably a Profibus®-board for connecting the field device to a Profibus® fieldbus, wherein, in the I/O-board, the generic mathematical function is automatically applicable to a fieldbus-specific parameter address. Accordingly, the I/O-board is embodied in the further development as a fieldbus-board, i.e. it serves for connecting the field device to a fieldbus. Depending on which kind of fieldbus (Profibus®, Foundation® Fieldbus, HART®, etc) the field device is to be connected to, a correspondingly embodied I/O-board, or fieldbus-board, must be provided in the field device. In such case, field devices are, as a rule, so embodied, that their fieldbus-board is exchangeable with another fieldbus-board (for example, for another bus system). Preferably, the application of the mathematical function is performed by a correspondingly embodied piece of software, which is implemented in the I/O-board, especially in a microprocessor, a CPU, or some other processor unit of the I/O-board. The I/O-board includes, in such case, preferably, one or more of the functionalities, which were explained in the introductory part in reference to the I/O- and power-board.

In an advantageous further development, the field device has an I/O-board for connecting the field device to a fieldbus and a main board, wherein the I/O-board and the main board communicate with one another via a communication interface. In this way, a modular construction of the field device is achieved. The communication interface is preferably embodied as an ISI-interface (Internal Serial Interface). Besides, also yet further hardware components, such as, for example, a display- and/or servicing-unit, a separate power-board, etc., can be provided. As indicated in the introductory part, the I/O-board can also have an integrated power section, so that it is embodied as an I/O- and power-board.

In an advantageous further development, the plurality of parameters includes parameters relevant for the I/O-board, and parameters relevant for the main board. Preferably, there is assigned to the I/O-board a memory, in which the parameters relevant for the I/O-board are stored, and/or there is assigned to the main board a memory, in which the parameters relevant for the main board are stored. Preferably, both memories are provided. As explained in the introductory part of the description, by the modular storing of the parameters, a communication between the I/O-board and the main board is not required, in case a service to be executed concerns only one parameter, which is stored in the memory of the I/O-board. In this way, speed in the performance of the relevant service can be increased. Further, software-updates of the main board and of the I/O-board can be executed largely independently of one another.

In an advantageous further development of the invention, additionally a method for operating a field device of the invention is provided. In the method, following receipt of a telegram with at least one fieldbus-specific parameter address, via a fieldbus, to which the field device is connected, the following step is executed automatically in the field device: Applying the generic, mathematical function to the at least one, received, fieldbus-specific parameter address and ascertaining the associated, device-internal parameter address. In the bus system, Profibus®, as a rule, acyclic services are applied for the reading and writing of parameters; the present invention is, however, also applicable in the case of cyclic services. Through the method according to the further development, the associated, device-internal parameter address can be obtained in simple and fast manner. The further developments explained above with reference to the field device of the invention are, in such case, implementable also in the method in corresponding manner, wherein, in each case, the advantages explained above can be achieved.

BRIEF DESCRIPTION OF THE DRAWINGS

Further advantages and purpose-aiding features of the invention will be evident on the basis of the following description of examples of embodiments with reference to the drawing, the figures of which show as follows.

DETAILED DISCUSSION

Figure 1:
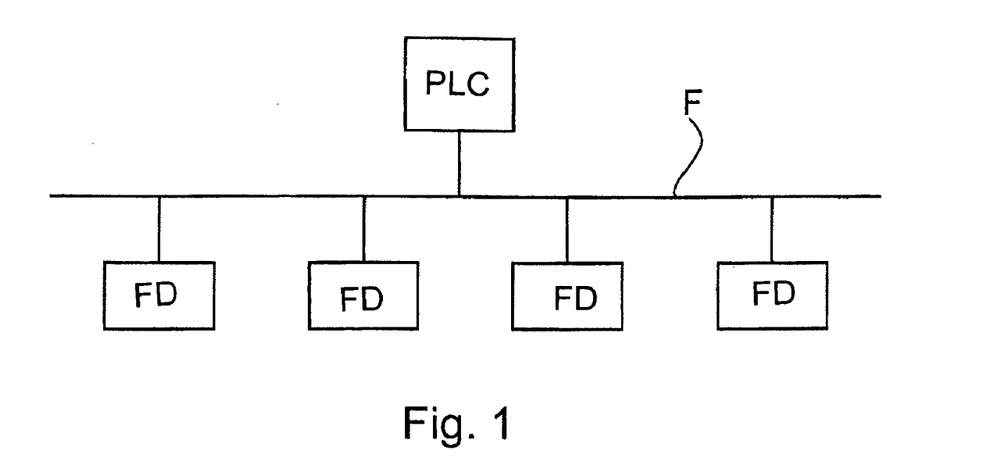
FIG. 1 a schematic representation of a simple fieldbus network.

FIG. 1 is a schematic presentation of a simple fieldbus network, in the case of which four field devices FD0, FD1, FD2 and FD3 and a control unit PLC are connected to a fieldbus F. Fieldbus F works according to one of the known fieldbus standards of Profibus® (DP, PA or FMS). The control unit PLC is a Profibus master, while the field devices FD0, FD1, FD2 and FD3 are Profibus slaves. Communication between the control unit PLC and the field devices FD0, FD1, FD2 and FD3 occurs according to the corresponding Profibus® standard.

Figure 2:
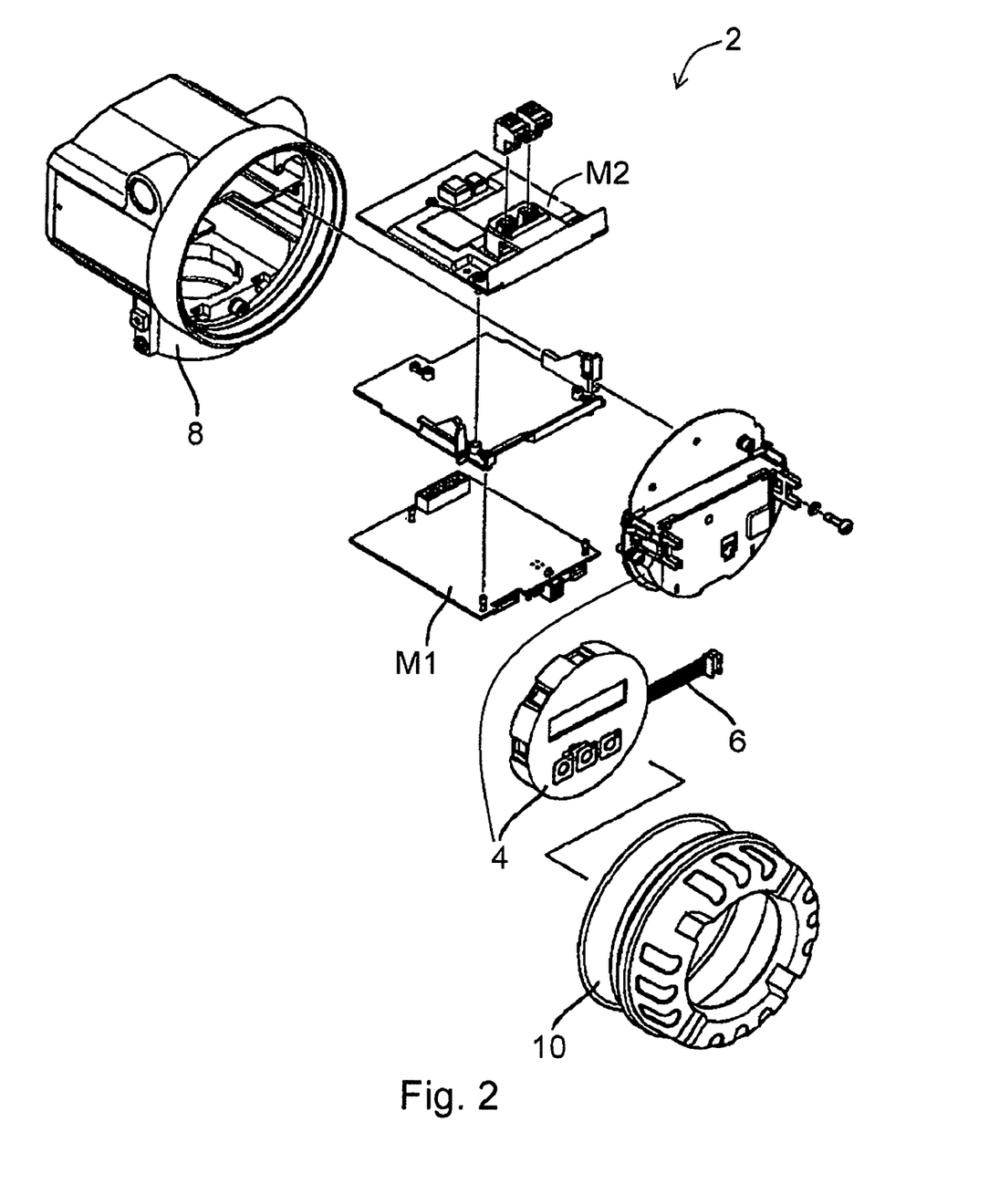
FIG. 2 a schematic, exploded drawing of a modularly constructed field device.

FIG. 2 shows, schematically in exploded view, a typical construction of a modularly built sensor 2 (here, a flow measuring device), which is embodied as a 2-conductor device. Such 2-conductor devices are "bus-fed", which means, that both communication as well as also electrical current supply occurs over a shared, 2-conductor connection. The device electronics of the sensor includes, essentially, two electronics modules, a main board M1, which is embodied as an amplifier board, and an I/O- and power-board M2. The I/O- and power-board M2 is embodied as regards software and hardware in such a manner that it provides for communication with a fieldbus. The I/O- and power-board is, thus, embodied as a fieldbus board, i.e. for connecting the sensor 2 to a corresponding fieldbus. Additionally provided in the form of a hardware module is a display- and servicing-unit 4, which is connectable via a cable connection 6 to the main board M1. The electronics modules M1 and M2, as well as the display- and servicing-unit 4 are arranged in a housing 8 having a housing lid 10, which can be screwed on.

Figure 3:
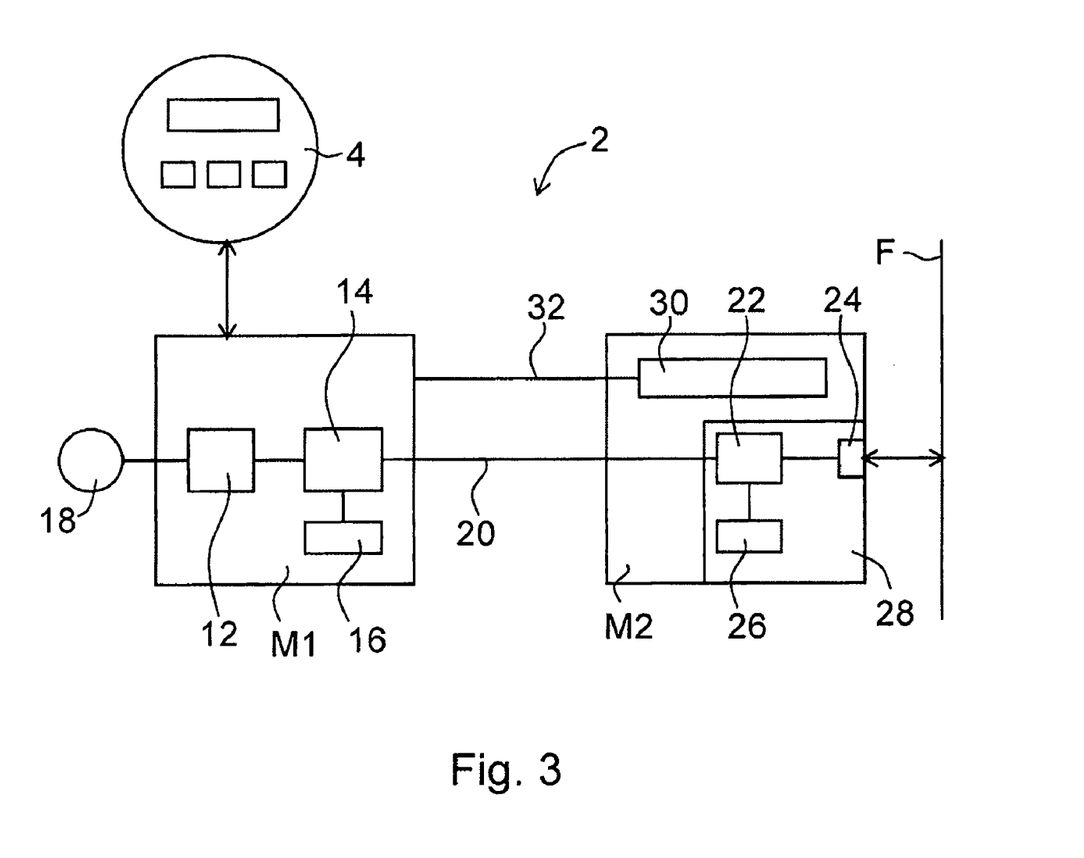
FIG. 3 the field device of FIG. 2 illustrated by a schematic block diagram of the electronics of the main board and of the I/O- and power-board.

FIG. 3 shows a block diagram of the electronics of the main board M1 and the I/O- and power-board M2 of the sensor 2 of FIG. 2. The main board M1 includes a signal-processing unit 12, a microprocessor 14 and a data memory 16, which is embodied, for example, as an EEPROM. Besides this, also other memories can be provided, such as, for example, a RAM, etc. The signal-processing unit 12 is connected with a measured value transducer 18 (here, for registering a flow in a section of pipeline) and serves for preprocessing a measurement signal delivered from the measured value transducer 18. For example, the analog signals delivered from the measured value transducer 18 are converted into digital signals. Further processing then takes place in the microprocessor 14. Stored in the data memory 16 are, especially, the parameters of the sensor 2 relevant for the main board M1. For communicating with one another, the main board M2 and the I/O- and power-board M2 are connected together via an ISI (Internal Serial Interface) 20.

The I/O- and power-board M2 includes a microprocessor 22, a fieldbus interface 24 and a data memory 26, which is embodied, for example, as an EEPROM. Besides this, also other memories can be provided, such as, for example, a RAM, etc. These components, referred to in the following as the fieldbus module 28, serve for connecting the sensor 2 to a fieldbus F. Depending on the kind of fieldbus (e.g. Profibus®, Foundation® Fieldbus, HART®, etc.) that the sensor 2 is to connect to, the software of the fieldbus module 28 (and, on occasion, also a portion of the hardware components of the fieldbus module 28, such as, for example, the fieldbus interface 24) must be appropriate for that fieldbus. As shown in FIG. 3, the sensor 2 is connected to the fieldbus F via the fieldbus interface 24. The sending and receiving of digital signals (appropriately for the particularly used, type of fieldbus) is performed by the fieldbus interface 24 via the fieldbus F. This functionality is, in such case, especially associated with layer 1 (and, on occasion, 2) of the OSI reference module (Open Systems Interconnection reference module). Often, the fieldbus interface 24 includes an ASIC (Application Specific Integrated Circuit) for effecting this sending and receiving functionality. Via the microprocessor 22 of the I/O- and power-board M2, the individual components of the I/O- and power-board M2 are coordinated; especially, the fieldbus interface 24 is activated by the microprocessor 22. Additionally, messages, which are sent from the main board M1 to the I/O- and power-board M2 for forwarding to the fieldbus F, are represented in the microprocessor 22 according to the particularly used, bus protocol (e.g. Profibus® Profile Specification, Version 3.0 for Profibus®; Foundation® Specification, Function Block Application Process, Revision FS 1.7 for Foundation® Fieldbus) and sent via the fieldbus interface 24 to the fieldbus F. In reverse, messages, which are represented according to the particularly used, fieldbus protocol and received via the fieldbus F, are decoded in the microprocessor 22, and, in case they relate to the main board M1, forwarded in a representation independent of the particularly used, fieldbus protocol, to the main board M1. Stored in the data memory 26 are, especially, the parameters of the sensor 2, which are relevant for the I/O- and power-board M2.

Additionally, the I/O- and power-board M2 includes a power portion 30, via which the sensor 2 is supplied with electric power. Power portion 30 receives, in such case, electric power via the 2-conductor connection, via which the sensor 2 is connected to the fieldbus F. As shown schematically in FIG. 3 by the line 32, the power portion 30 also supplies the main board M1 and the display- and servicing-unit 4 with electric power.

Figure 4:
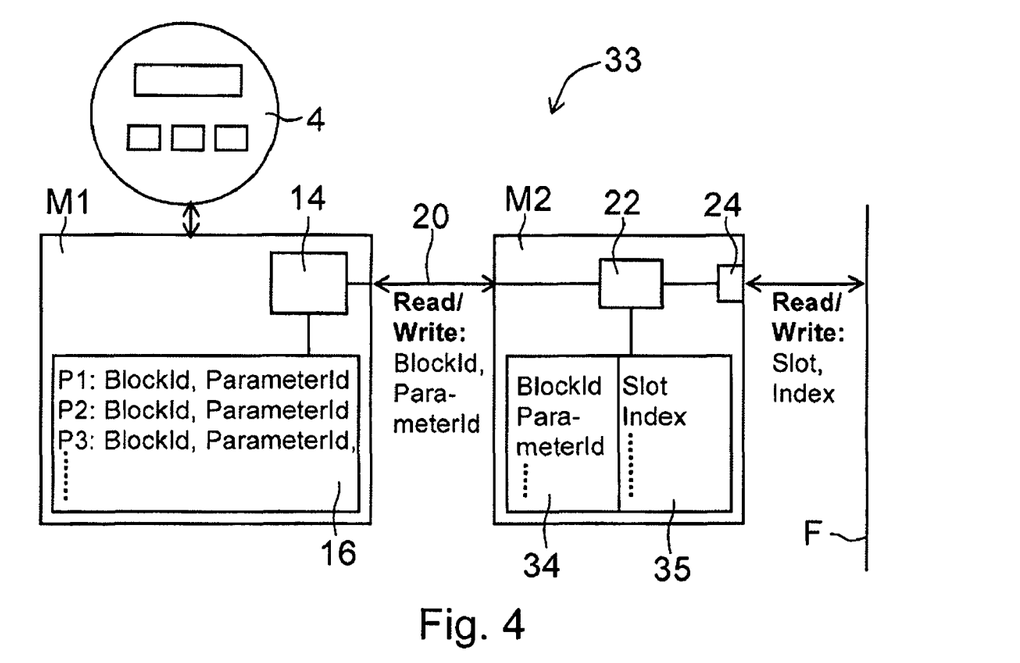
FIG. 4 a schematic presentation of the associating of device-internal parameter addresses to fieldbus-specific parameter addresses in a field device of the state of the art using a mapping table.

In order to enable an associating of the device-internal parameter addresses with the respective fieldbus-specific parameter addresses, to this point in time, so-called mapping-tables have been used, in which each of the fieldbus-specific parameter addresses is associated with a correspondingly belonging device-internal parameter address. This associating is shown schematically in FIG. 4, wherein, primarily, only the components relevant for the associating of the parameter addresses are shown. The structure of the sensor 33 shown in FIG. 4 can, in such case, correspond to the structure of the sensor 2 shown in FIGS. 2 and 3. In the present example, via the fieldbus F, which is embodied according to the bus system, Profibus®, a telegram (from a not-illustrated, superordinated unit or a servicing unit) is received, in which a read- or write-command of a parameter of the sensor 33 is contained. For addressing the parameter, its fieldbus-specific parameter address, thus its slot and index, is specified in the telegram. In order, within the sensor 33, to enable an access to the relevant parameter, its device-internal parameter address must be determined. For this, in a memory 35 of the I/O- and power-board M2 embodied as a RAM-memory, a mapping table 34 is provided. The microprocessor 22 of the I/O- and power-board M2 accesses the mapping table 34 in the memory 35 and reads for the slot and index of the fieldbus-specific parameter address contained in the telegram the belonging device-internal parameter address, thus the BlockID and ParameterID. In the present case, the device-internal parameter address is for a parameter relevant for the main board M1 and is stored in the data memory 16 of the main board M1. Accordingly, the microprocessor 22 forwards the received read- or write-command, together with the device-internal parameter address (BlockID, ParameterID) to the microprocessor 14 of the main board M1. The microprocessor 14 can then, on the basis of the device-internal parameter address, access the relevant parameter (e.g. P1, P2 or P3 in FIG. 4), which is stored in the data memory 16 of the main board M1, and execute the further steps required for performing the read- or write-command. If, on the other hand, the device-internal parameter address concerns a parameter, which is relevant for the I/O- and power-board M2 and stored in the data memory 26 (not shown in FIG. 4) of the I/O- and power-board M2, then the device-internal parameter address and the read- or write command are not forwarded to the main board M1. Rather, then, the microprocessor 22 of the I/O- and power-board M2 accesses the relevant parameter stored in the data memory 26 of the I/O- and power-board M2, and the steps required for the read- or write-command are performed.

Such a mapping table is comprehensive and can include 2000 or more entries, so that costs and effort for its creation are relatively high. As a rule, provided in the main board and in the I/O- and power-board (or, on occasion, in an I/O-board) are different software modules, each having a different software identification number. If, in the case of a software update of the main board, a new parameter (with a corresponding device-internal parameter address) is introduced, then it has been necessary, to this point in time, also to conduct a corresponding software update of the software of the I/O- and power-board, so that the device-internal parameter address and the associated fieldbus-specific parameter address of the new parameter are registered in this software and especially in the mapping table. Depending on the new parameter, this can mean a need for a new certification of the software of the I/O- and power-board at an accreditation center (e.g. a Profibus® certification laboratory). Connected with this are significant costs and effort for the associated adjusting of the software of the I/O- and power-board, even though the basic software of the I/O- and power-board has not changed.

Figure 5:
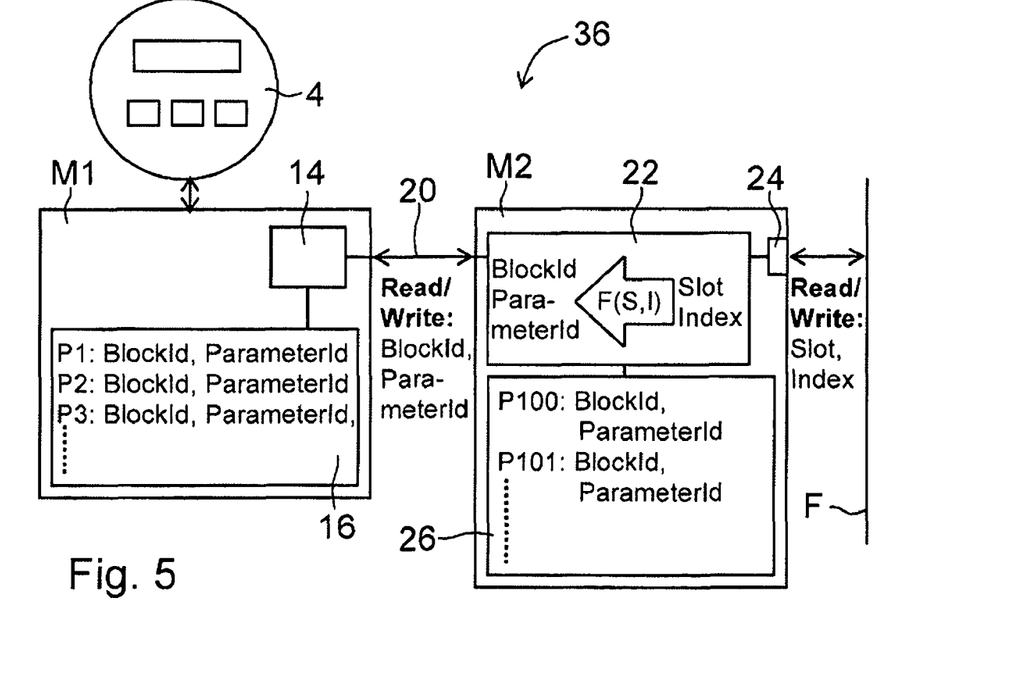
FIG. 5 a schematic presentation of the associating of device-internal parameter addresses to fieldbus-specific parameter addresses in a field device of the present invention.

In the following, a field device 36 of the invention will be described with reference to FIG. 5. Field device 36 is embodied as a sensor. Additionally to be described will be the associating of the device-internal parameter addresses with the respective fieldbus-specific parameter addresses in the field device 36 using a generic mathematical function. In the case of the field device 36 of FIG. 5, primarily only the components relevant for the associating of the parameter addresses are shown. The construction of the field device 36 shown in FIG. 5 can, in such case, correspond to the construction of the sensor 2 shown in FIGS. 2 and 3. For equal components, equal reference characters are applied as in FIGS. 2 and 3. As concerns the construction and functionality of these components, especially, reference is made to the introductory part of the description.

Figure 6:
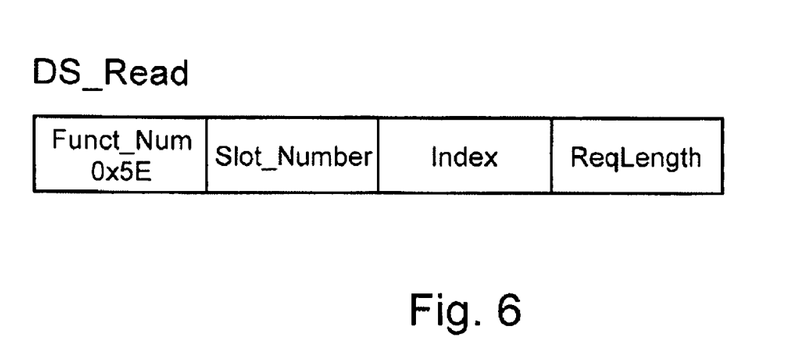
FIG. 6 an illustration of the structure of a DS_read telegram.
Figure 7:
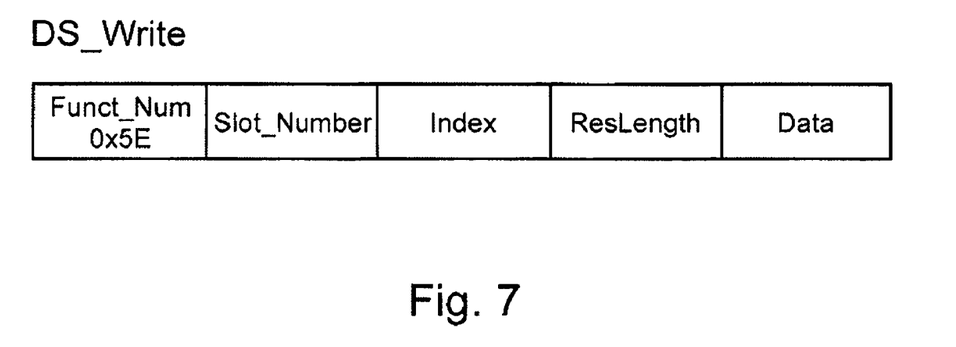
FIG. 7 an illustration of the structure of a DS_write telegram.

In the following, an example will be described, in which a telegram (from a superordinated unit or a servicing unit (neither of which is shown)) is received via the fieldbus F, which is embodied according to the bus system, Profibus®. The telegram concerns a read or write command of a parameter of the field device 36. The structure of a telegram, via which, in the bus system, Profibus®, in an acyclic service "DS_Read", a read command of a parameter is initiated by a master (class 2), is shown in FIG. 6 by way of example. The structure of a telegram, via which, in the bus system, Profibus®, in an acyclic service "DS_Write", a write command of a parameter is initiated by a master (class 2), is shown in FIG. 7 by way of example. In order to identify the parameter to be read or written, its fieldbus-specific parameter address, i.e. its "Slot" and "Index", is specified in the telegram (observe "Slot_Number" and "Index" in FIGS. 6 and 7).

In order to make possible an access to the parameter of interest within the field device 36, its device-internal parameter address must be specified. To this end, there is implemented, in the microprocessor 22 of the I/O- and power-board M2, software, via which a generic mathematical function F(S,I) is applied to the fieldbus-specific parameter address. For the variables "S" and "I" of the generic mathematical function F(S,I) are input, in such case, the slot and the index, respectively, of the fieldbus-specific parameter address contained in the telegram. There results the device-internal parameter address, especially the coordinates, BlockID and ParameterID. In the present example of an embodiment, the generic mathematical function F(S,I) contains two sub-functions, $F_1(S)$ and $F_2(I)$, wherein the following equations hold:

$$\text{BlockID} = F_1(S) = S + a; \quad (1)$$

$$\text{ParameterID} = F_2(I) = I + b. \quad (2)$$

In the present instance of an example, the coordinate values for BlockID and ParameterID are obtained, in each case, by addition of a constant offset to the slot-value (S), or to the index-value (I), as the case may be. Often, the first indices for the various slots are set forth in the fieldbus-specific parameter address system, so that, preferably, the offset "b" in Equation (2) is selected to be negative. Additionally, the offset "b", in contrast with the situation in Equation (2), can also depend on the slot-value "S". This is especially the case, when the number of the parameters set forth for the various slots differs. The offset "a" can also be "0", so that the BlockID, in each case, is equal to the slot-value.

If the device-internal parameter address concerns a parameter, which is relevant for the main board M1 and is stored in the data memory 16 of the main board M1, then the microprocessor 22 of the I/O- and power-board M2 outputs the received read- or write-command together with the device-internal parameter address (BlockID, ParameterID) to the microprocessor 14 of the main board M1. Microprocessor 14 can then access, on the basis of the device-internal parameter address, the parameter of interest (e.g. P1, P2 or P3 in FIG. 5), which is stored in the data memory 16 of the main board M1, and perform the further steps required for execution of the read- or write-command. If the device-internal parameter address concerns, in contrast, a parameter, which is relevant for the I/O- and power-board M2 and is stored in the data memory 26 of the I/O- and power-board M2, then the device internal parameter address and the read- or write-command is not forwarded to the main board M1. Rather, then microprocessor 22 of the I/O- and power-board M2 accesses the parameter of interest (e.g. P100 or P101 in FIG. 5), which is stored in the data memory 26 of the I/O- and power-board M2, and performs the steps required for the read- or write-command.

An example will now be explained, in which a software update of the software in the microprocessor 14 of the main board M1 is performed. In the context of this software update, an additional parameter "Pnew", which is relevant for the main board M1 and which, accordingly, is for storage in the data memory 16 of the main board M1, is introduced. Due to the software update, a changed "Device Description" (DD) and, as a rule, also a changed "Device Type Manager" (DTM) are constructed for the field device 36. The "Device Description" (DD) serves for describing the functionality of a field device. It contains, especially, information concerning the variables contained in the field device, their limit values, and the access to these variables. A "Device Type Manager" is a piece of device-specific software, which encapsulates all data and functions of the relevant field device and, simultaneously, provides graphical operating/servicing elements. Especially, "Device Type Managers" provide functions for access to variables of the field device and to diagnostic functions. For its execution, the "Device Type Manager" requires an FDT frame application, wherein FDT stands for Field Device Tool.

Accordingly, via the "Device Description" (DD) and/or the "Device Type Manager" (DTM), by means of an operating, or servicing, program, the associated fieldbus-specific parameter address can be ascertained. The device-internal address of the newly introduced parameter "Pnew" is determined by applying the generic mathematical function, which is also applied by the software of the microprocessor 22 of the I/O- and power-board, to the fieldbus-specific parameter address of this new parameter "Pnew". The new parameter "Pnew" is stored in the data memory 16 of the main board M1 at the so-ascertained, device-internal parameter address. A software-update of the software implemented on the microprocessor 22 of the I/O- and power-board M2, is, in such case, not required. Rather, there is already in the existing software the application of the generic mathematical function for any, received, fieldbus-specific parameter address, and this is applied also in the case of the new parameter "Pnew" to achieve a correct determining of its device-internal parameter address from the associated, fieldbus-specific parameter address.

The present invention is not limited to the examples of embodiments shown in the figures. Especially, in FIGS. 2 and 3, only components of the sensor 2 are shown, which are relevant for the description of the state of the art and the present invention. Besides what is shown, also other components can be provided. Especially, when the field device of interest is embodied as a 4-conductor device, which means that, besides the 2-conductor connection for communication, another 2-conductor connection for supplying the field device with electrical power is provided, for example, a separate power-board can be provided in the field device.

Also in the associating of the device-internal parameter addresses with the fieldbus-specific parameter addresses by means of the generic mathematical function, different variants are possible. For instance, rather than as indicated in Equations (1) and (2), for example, a plurality of blocks, i.e. a plurality of BlockIDs, can be assigned to one slot, and vice versa. Also, it is not necessary, that the slope in the two sub-functions of the Equations (1) and (2) be, in each case, "1", and that, in each case, a linear function be involved. Additionally, the generic mathematical function can also not be separable into two, independent, sub-functions.

Additionally, it is not necessary that, in a field device, all device-internal parameter addresses be determinable by a generic mathematical function from the associated fieldbus-specific parameter addresses. Rather, for one portion of the parameters, also a second generic mathematical function or also the mapping table explained in reference to the state of the art can be used.

The invention claimed is:

1. A field device of process automation technology having a plurality of parameters, with each of which is associated a device-internal parameter address, the field device being connectable to a fieldbus having a fieldbus-specific parameter addressing system, including:
   means for providing a generic mathematical function, wherein:
   the device-internal parameter addresses of the plurality of parameters are determinable by application of the generic mathematical function to associated fieldbus-specific parameter addresses formed according to the fieldbus-specific parameter addressing system;
   the application of the mathematical function is performed by a correspondingly embodied piece of software which is implemented in a microprocessor; and as a result of the application of the generic mathematical function the device internal parameter address is received.

2. The field device as claimed in claim 1, wherein:
the device-internal parameter addressing system, the plurality of parameters are assigned to device-internal groups, or blocks, and each of the parameters assigned to a device-internal group is distinguished by a device-internal index, such as a corresponding parameter identification; and,
in the fieldbus-specific parameter addressing system, the plurality of parameters are assigned to fieldbus-specific groups, or slots, and each of the parameters assigned to a slot is distinguished by a fieldbus-specific index.

3. The field device as claimed in claim 2, wherein:
the generic mathematical function associates, in each case, a fieldbus-specific group of a fieldbus-specific parameter address with an associated device-internal group and a fieldbus-specific index of the fieldbus-specific parameter address with an associated device internal index.

4. The field device as claimed in claim 1, wherein:
the device-internal parameter addresses, the fieldbus-specific parameter addresses and the generic mathematical function are selected in such a manner that the number of parameters of the field device, the number of groups and/or indices in each of the groups, is increasable, and, furthermore, by application of the generic mathematical function, an associating of the device-internal parameter addresses with the fieldbus-specific parameter addresses of an increased number of parameters of the field device can be accomplished.

5. The fieldbus as claimed in claim 1, wherein:
the generic mathematical function is reversible.

6. The fieldbus as claimed in claim 1, wherein:
the field device is embodied in such a manner that the generic mathematical function is automatically applicable to a fieldbus-specific parameter address and, therefrom, the device-internal parameter address is determinable.

7. The field device as claimed in claim 6, wherein:
the field device has an I/O-board for connecting the field device to a fieldbus, such as a Profibus® board for connecting the field device to a Profibus® fieldbus; and in the I/O-board, the generic mathematical function is automatically applicable to a fieldbus-specific parameter address.

8. The field device as claimed in claim 1, wherein:
the field device has an I/O-board for connecting the field device to a fieldbus, and a main board; and
the I/O-board and the main board communicate with one another via a communication interface.

9. The field device as claimed in claim 8, wherein:
the plurality of parameters includes parameters relevant for the I/O-board and parameters relevant for the main board; and
assigned to the I/O-board is a memory, in which the parameters relevant for the I/O-board are stored, and/or assigned to the main board is a memory, in which the parameters relevant for the main board are stored.

10. A method for operating a field device having a plurality of parameters, with each of which is associated a device-internal parameter address, the field device being connectable to a fieldbus having a fieldbus-specific parameter addressing system, including:
means for providing a generic mathematical function, wherein:
the device-internal parameter addresses of the plurality of parameters are determinable by application of the generic mathematical function to associated fieldbus-specific parameter addresses formed according to the fieldbus-specific parameter addressing system, comprising:
performing the application of the mathematical function by a corresponding embodied piece of software which is implemented in a microprocessor, as a result of the application of the generic mathematical function the device internal parameter address is received;
following receipt of a telegram with at least one fieldbus-specific parameter address, via a fieldbus, to which the field device is connected, a step is executed automatically in the field device as follows:
applying the generic mathematical function to the at least one, received, fieldbus-specific parameter address and ascertaining the, device-internal parameter address.

* * * * *